(12) United States Patent
Yun et al.

(10) Patent No.: US 10,026,369 B2
(45) Date of Patent: Jul. 17, 2018

(54) LIQUID CRYSTAL DISPLAY AND DRIVING METHOD THEREOF

(71) Applicant: SAMSUNG DISPLAY CO., LTD., Yongin-si, Gyeonggi-do (KR)

(72) Inventors: Sung-Jae Yun, Hwaseong-si (KR); Dong Han Song, Hwaseong-si (KR); Ki Chul Shin, Seongnam-si (KR); Hyeok Jin Lee, Seongnam-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 229 days.

(21) Appl. No.: 15/012,659

(22) Filed: Feb. 1, 2016

(65) Prior Publication Data

US 2016/0329022 A1  Nov. 10, 2016

(30) Foreign Application Priority Data

May 4, 2015  (KR) .................. 10-2015-0062596

(51) Int. Cl.
*G06F 1/00* (2006.01)
*G09G 3/36* (2006.01)
(Continued)

(52) U.S. Cl.
CPC ............ *G09G 3/36* (2013.01); *G02F 1/1337* (2013.01); *G02F 1/133305* (2013.01);
(Continued)

(58) Field of Classification Search
CPC ...... G02F 1/13305; G02B 6/0093; G02B 1/14
See application file for complete search history.

(56) References Cited

U.S. PATENT DOCUMENTS 9,261,720 B2 * 2/2016 Lee ................... G02B 6/0093
2007/0057257 A1  3/2007 Kim
(Continued)

FOREIGN PATENT DOCUMENTS

| KR | 10-0607741 B1 | 7/2006 |
| KR | 10-2006-0105188 A | 10/2006 |
| KR | 10-2012-0077608 A | 7/2012 |

OTHER PUBLICATIONS

European Search Report corresponding to EP 16168195.2, dated Sep. 1, 2016, 9 pages.

*Primary Examiner* — Michael Faragalla
(74) *Attorney, Agent, or Firm* — Innovation Counsel, LLP

(57) ABSTRACT

A liquid crystal display having a curved surface includes: a display panel including a first display panel, a second display panel, and a liquid crystal layer interposed therebetween and including liquid crystal molecules. The first display panel includes a first substrate on which a plurality of gate lines and data lines are formed, a first electrode, and a pixel electrode. The second display panel includes a second substrate facing the first substrate and a second electrode. The liquid crystal display further includes a common voltage supplier applying two voltages having a predetermined voltage difference to the first and second electrodes within a period before a frame displaying an image on the display panel; a gate driver applying a gate signal to each of the gate lines after the period; and a data driver applying a data voltage to the pixel electrode corresponding to the gate signal.

10 Claims, 8 Drawing Sheets

(51) Int. Cl.
*G02F 1/1333* (2006.01)
*G02F 1/1343* (2006.01)
*G02F 1/1362* (2006.01)
*G02F 1/1337* (2006.01)

(52) U.S. Cl.
CPC .. *G02F 1/134309* (2013.01); *G02F 1/134336* (2013.01); *G02F 1/136213* (2013.01); *G02F 1/136286* (2013.01); *G09G 3/3655* (2013.01); *G02F 2001/133742* (2013.01); *G02F 2201/12* (2013.01); *G09G 2380/02* (2013.01)

(56) References Cited

U.S. PATENT DOCUMENTS

2011/0255039 A1* 10/2011 Enomoto .......... G02F 1/133305
 349/113
2015/0301232 A1* 10/2015 Wu .................... G02B 1/14
 359/489.07

* cited by examiner

LIQUID CRYSTAL DISPLAY AND DRIVING METHOD THEREOF

CROSS-REFERENCE TO RELATED APPLICATION

This application claims priority to and the benefit of Korean Patent Application No. 10-2015-0062596 filed in the Korean Intellectual Property Office on May 4, 2015, the disclosure of which is incorporated herein by reference in its entirety.

BACKGROUND

1. Field

The technical field is related to a liquid crystal display and a driving method thereof, and more particularly, to a liquid crystal display and a driving method thereof capable of preventing a light leakage phenomenon.

2. Description of Related Art

A typical liquid crystal display device includes two sheets of display panels in which field generating electrodes (such as a pixel electrode and a common electrode) are disposed and a liquid crystal layer disposed between the display panels. A voltage is applied to at least one of the field generating electrodes to generate an electric field in the liquid crystal layer. The electric field controls directions of liquid crystal molecules contained in the liquid crystal layer, thus controls transmittance of incident light through the liquid crystal layer to display an image.

The liquid crystal display has generally used glass as a substrate. Recently, a flexible display device that is capable of being bent or folded has been developed. Such a flexible display device uses a liquid crystal display made of a flexible material such as plastic as a substrate.

The display panels of a curved liquid crystal display are bent at a predetermined curvature, therefore an external force is applied to a liquid crystal layer interposed between the substrates to form and maintain the curvature of the display panels. As a result, an alignment of the liquid crystal molecules may be distorted by the external force applied to the liquid crystal layer. The alignment of distorted liquid crystal molecules may be difficult to control by the electric field generated in the liquid crystal layer, thus the light transmittance of through the liquid crystal layer is difficult to control. For example, a light leakage phenomenon may occur in the curved liquid crystal display.

The disclosure in this Background section is only for enhancement of understanding of the background information of the described technology and therefore it may contain information that does not form a prior art that is known to a person of ordinary skill in the art.

SUMMARY

The present disclosure provides a curved liquid crystal display capable of preventing a light leakage phenomenon in a liquid crystal display.

An exemplary embodiment provides a liquid crystal display including: a display panel including a first display panel that includes a first substrate on which a plurality of gate lines and data lines intersecting with each other are formed, a first electrode formed on the first substrate, and a pixel electrode disposed on the first electrode, a second display panel that includes a second substrate facing the first substrate and a second electrode formed on the second substrate, and a liquid crystal layer that is interposed between the first display panel and the second display panel and includes liquid crystal molecules, wherein the display panel has at least one portion formed in a curved surface; a common voltage supplier applying two voltages having a predetermined voltage difference to the first electrode and the second electrode within a period before a frame displaying an image on the display panel; a gate driver applying a gate signal having an enable level to each of the gate lines, after the period; and a data driver applying a data voltage to the pixel electrode corresponding to the gate signal.

The display panel may further include: a first alignment layer disposed between the pixel electrode and the liquid crystal layer and horizontally aligning the liquid crystal molecules adjacent to the pixel electrode; and a second alignment layer disposed between the second electrode and the liquid crystal layer and horizontally aligning the liquid crystal molecules adjacent to the second electrode.

Alignment directions of the first alignment layer and the second alignment layer may be parallel to each other.

The liquid crystal layer may further include reactive mesogen that helps a pretilt of the liquid crystal molecules.

The common voltage supplier may apply a substantially same voltage to the first electrode and the second electrode before the data voltage is applied to the pixel electrode and after the period.

The liquid crystal display may further include: a signal controller controlling the common voltage supplier, the gate driver, and the data driver based on a control signal and an image signal input, wherein the signal controller controls the common voltage supplier to apply the two voltages having the predetermined voltage difference to the first electrode and the second electrode within the period when the control signal and the image signal are received.

Another embodiment provides a driving method of a liquid crystal display including a display panel including a first display panel that includes a first substrate on which a plurality of gate lines and data lines intersecting with each other are formed, a first electrode formed on the first substrate, and a pixel electrode disposed on the first electrode, a second display panel that includes a second substrate facing the first substrate and a second electrode formed on the second substrate, and a liquid crystal layer that is interposed between the first display panel and the second display panel and includes liquid crystal molecules, the display panel having at least one portion formed in a curved surface, the driving method including: applying two voltages having a predetermined voltage difference to the first electrode and the second electrode within a period before a frame displaying an image on the display panel; applying a substantially same voltage to the first electrode and the second electrode after the period; and applying a data voltage to the pixel electrode to display an image on the display panel after applying the substantially same voltage to the first electrode and the second electrode.

The driving method may further include: displaying the image on the display panel based on a control signal and an image signal; and when the control signal and the image signal are received, applying two voltages having the predetermined voltage difference to the first electrode and the second electrode within the period.

The display panel may further include: a first alignment layer disposed between the pixel electrode and the liquid crystal layer and horizontally aligning the liquid crystal molecules adjacent to the pixel electrode; and a second alignment layer disposed between the second electrode and the liquid crystal layer and horizontally aligning the liquid crystal molecules adjacent to the second electrode.

The alignment directions of the first alignment layer and the second alignment layer may be parallel to each other.

The liquid crystal layer may further include reactive mesogen that helps a pretilt of the liquid crystal molecules.

According to at least one of the exemplary embodiments, it is possible to prevent a light leakage phenomenon that may occur in the liquid crystal display.

An additional scope of applicability of the present disclosure is obvious from the following detailed description. However, various changes and modifications within a spirit and a scope of the present disclosure may be clearly understood, and therefore the detailed description and a specific embodiment such as the exemplary embodiment is to be construed as being given as only an example.

DETAILED DESCRIPTION

Figure 1:
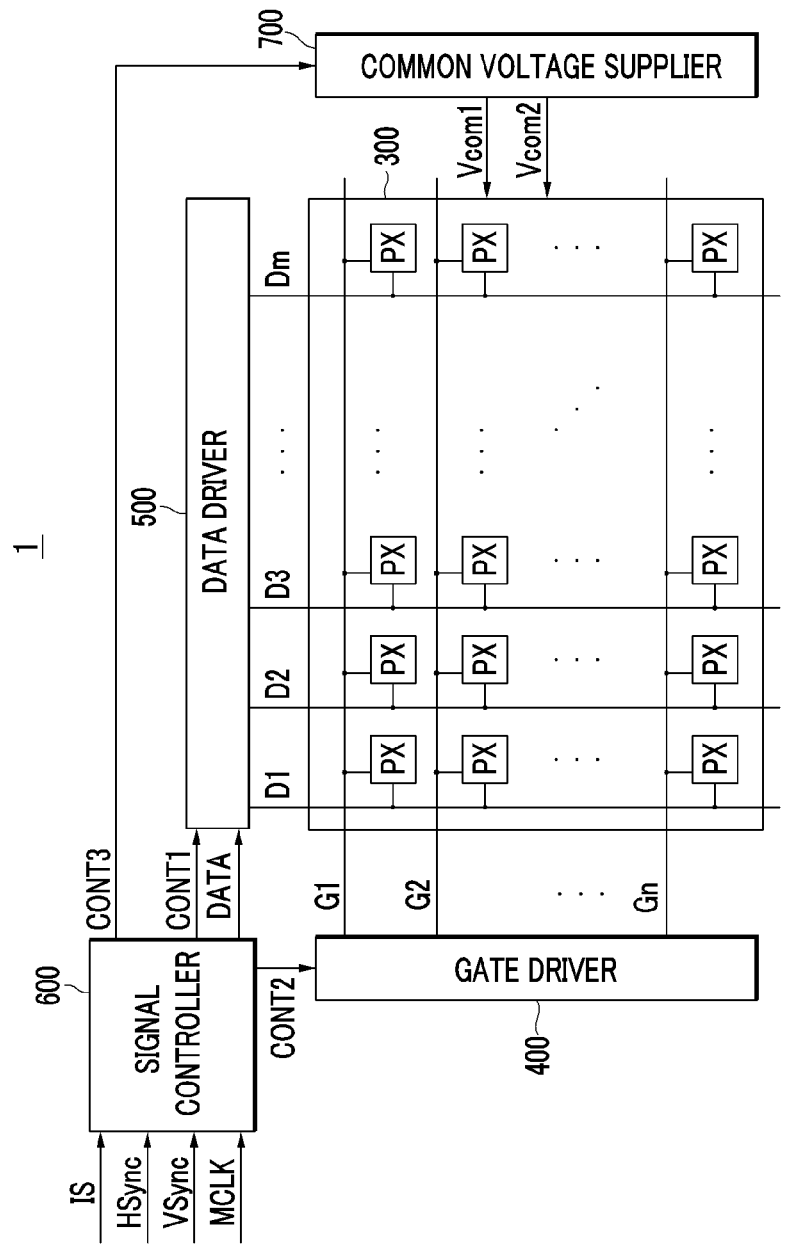
FIG. 1 is a schematic block diagram illustrating a liquid crystal display, according to an exemplary embodiment.

Embodiments will be described with reference to the accompanying drawings. The same or similar reference numerals will be used to describe the same or like components, and an overlapped description thereof may be omitted. Terms "modules" and "units" for components used in the following description may be used to easily make a specification. Therefore, the above-mentioned terms may not have meanings or roles that distinguish from each other in themselves. Further, when it is determined that the detailed description of a known art related to the present disclosure may obscure a gist of the present disclosure, the detailed description thereof may be omitted. Further, the accompanying drawings are provided to facilitate easy understanding of the technical spirit of the present disclosure disclosed in the present specification, therefore the technical spirit may not be limited to the accompany drawings. Therefore, it is to be construed that the accompanying drawings include all modifications, equivalents, and replacements included in the technical spirit and the technical scope disclosed in the present specification.

Terms including an ordinal number such as 'first', 'second', etc. can be used to describe various components, but the components are not to be construed as being limited to the terms. The terms are used to distinguish one component from another component.

It is to be understood that when one component is referred to as being "connected to" or "coupled to" another element, it may be connected directly to or coupled directly to another element or be connected to or coupled to another element, having one or more intervening element. On the other hand, it is to be understood that when one element is referred to as being "connected directly to" or "coupled directly to" another element, it may be connected to or coupled to another element without any intervening element.

Singular forms are to include plural forms unless the context clearly indicates otherwise. It will be further understood that the terms "include" or "have" used in the present disclosure, specify a presence of features, numerals, steps, operations, components, parts mentioned in the present specification, or a combination thereof, but do not preclude a presence or an addition of one or more other features, numerals, steps, operations, components, parts, or a combination thereof.

FIG. 1 is a schematic block diagram illustrating a liquid crystal display, according to an exemplary embodiment. A liquid crystal display 1 includes a display panel 300 displaying an image, a gate driver 400 and a data driver 500 connected to the display panel 300, a common voltage supplier 700 supplying a first common voltage Vcom1 and a second common voltage Vcom2 to the display panel 300, a backlight unit (not illustrated) supplying light to the display panel 300, and a signal controller 600 controlling the gate driver 400, the data drier 500, and the common voltage supplier 700.

When viewed from an equivalent circuit, the display panel 300 includes a plurality of display signal lines and a plurality of pixels PXs that are connected to the display signal lines. The plurality of pixels PXs may be arranged in a matrix form. The display signal lines include a plurality of gate lines G1 to Gn that transfer gate signals (also referred to as "scan signals") and a plurality of data lines D1 to Dm that transfer a data voltage. Each pixel PX may include switching devices, such as a thin film transistor (TFT) that are connected to the corresponding gate lines G1 to Gn and data lines D1 to Dm and a liquid crystal capacitor and a storage capacitor.

The display panel 300 includes the liquid crystal layer that may convert a data voltage applied to a pixel electrode into an optical signal to display an image. The signal controller 600 controls an operation of the gate driver 400, the data driver 500, the common voltage supplier 700, etc. The signal controller 600 receives an image signal IS and an input control signal from the outside. The image signal IS includes luminance information of each pixel PX of the display unit 10, and the luminance may be differentiated by a defined number, for example, 1024, 256, or 64 grays. In connection with the image signal IS, the input control signal may include a vertical synchronization signal Vsync and a horizontal synchronizing signal Hsync, a main clock Mclk, a data enable signal DE, etc.

The signal controller 600 processes the image signal IS based on the image signal IS and the input control signal to meet operating conditions of the display panel 300 and generates an image data signal DATA, a first control signal CONT1, a second control signal CONT2, a third control signal CONT3, etc. The first control signal CONT1 may include a horizontal synchronization start signal, a clock signal, a polarity inversion signal, and a line latch signal. The second control signal CONT2 may include an output enable signal and a gate pulse signal. The signal controller 600 outputs the second control signal CONT2 to the gate driver 400 and outputs the first control signal CONT1 and the image data signal DATA to the data driver 500.

The data driver 500 may be connected to the data lines D1 to Dm of the display panel 300 to divide a gray reference voltage received from a gray voltage generator (not illustrated) to generate a gray voltage for an entire gray or receive a plurality of gray voltages from the gray voltage generator. The data driver 500 receives the image data signal DATA for pixels PXs in one row depending on the first control signal CONT1 and selects gray voltages corresponding to each image data signal DATA from the gray voltages. The data driver converts the image data signal DATA into the data voltage and applies the data voltage to the data lines D1 to Dm.

The gate driver 400 is connected to the gate lines G1 to Gn and applies the gate signals. The gate signals are a combination of a gate-on voltage Von and a gate-off voltage Voff to the gate lines G1 to Gn. The gate driver 400 applies the gate-on voltage Von to the gate lines G1 to Gn depending on the second control signal CONT2 received from the signal controller 600 to turn-on the switching elements connected to the gate lines G1 to Gn. Next, the data voltages applied to the data lines D1 to Dm are transferred to the corresponding pixel PX through the turned-on switching element.

The common voltage supplier 700 is electrically connected to a first common electrode and a second common electrode that are formed in the display panel 300. The common voltage supplier 700 responds to a third control signal CONT3 supplied from the signal controller 600 and generates a first common voltage Vcom1 and a second common voltage Vcom2 having a high level or a low level at a predetermined timing.

The backlight unit (not illustrated) may be positioned behind the display panel 300 and may include at least one light source. Examples of the light source include, but are not limited to, a fluorescent lamp such as a cold cathode fluorescent lamp (CCFL), and a light emitting diode (LED). The light source included in the backlight unit may be turned-on or turned-off for a predetermined time. The backlight unit may further include at least one straight light guide plate that faces the display panel 300.

When displaying an image, the display panel 300 applies the gate-on voltage to the gate lines G1 to Gn and the data voltage to the pixels based on one horizontal period 1H (equal to one period of the horizontal synchronous signal and the data enable signal) as a unit. Hereinafter, the case in which the one horizontal period 1H is one frame will be described.

Figure 2:
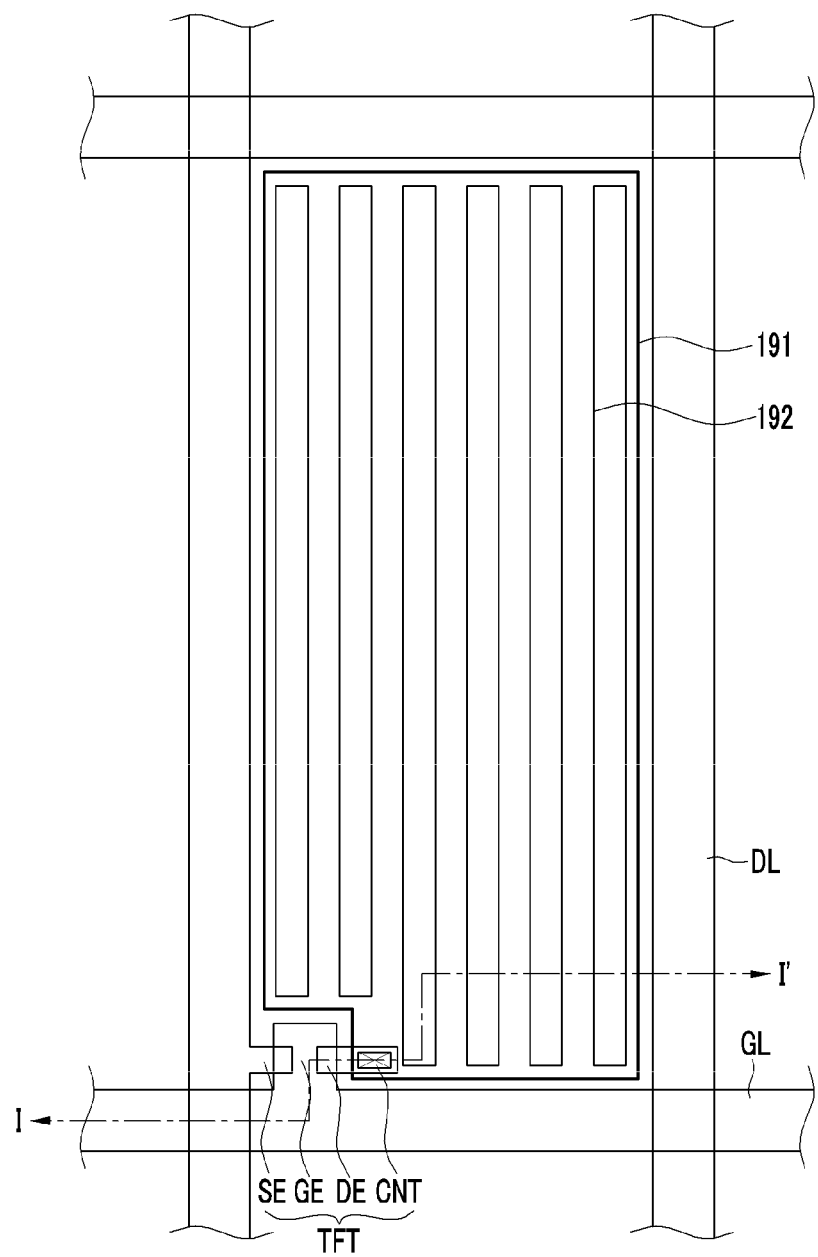
FIG. 2 is a plan view illustrating a portion of a display panel illustrated in FIG. 1.
Figure 3:
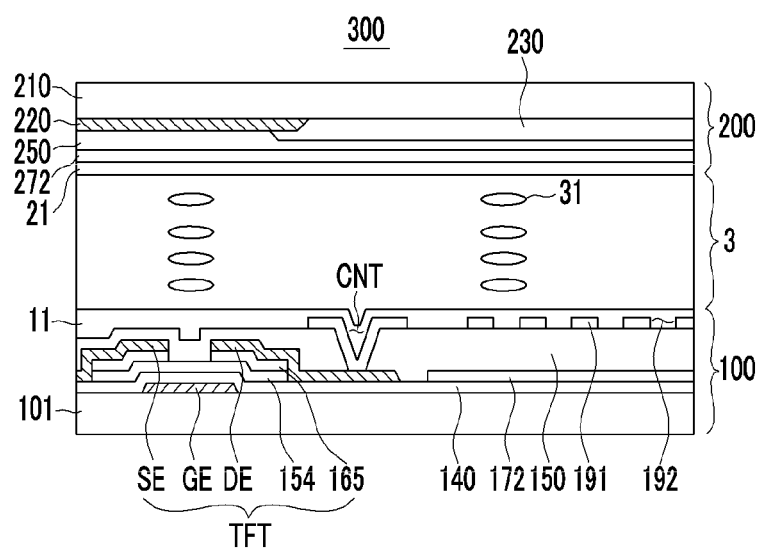
FIG. 3 is a cross-sectional view taken along line I-I' of FIG. 2.

Next, a structure of the pixel PX disposed in the display panel 300 will be described with reference to FIGS. 2 and 3. FIG. 2 is a plan view illustrating a portion of the display panel illustrated in FIG. 1, and FIG. 3 is a cross-sectional view taken along line I-I' of FIG. 2. Referring to FIGS. 2 and 3, the display 1 has the display panel 300 including a lower display panel 100 and an upper display panel 200 that are bonded to each other while facing each other. The liquid crystal layer 3 is disposed between the lower display panel 100 and the upper display panel 200.

The lower display panel 100 includes a first substrate 110, a gate line GL, a gate insulating layer 140, a data line DL, a switching element TFT, a first common electrode 172, a passivation insulating layer 150, a pixel electrode 191 and a first alignment layer 11. The first substrate 110 may be made of a transparent insulating material. For example, the first substrate 110 is a glass substrate, a soda-lime substrate, or a plastic substrate.

The gate line GL is formed on the first substrate 110. The gate line GL extends in a first direction and is arranged in parallel in a second direction that is perpendicular to the first direction. The gate insulating layer 140 is disposed on a gate electrode GE of the switching element TFT. The gate insulating layer 140 may be made of an insulating material such as silicon nitride (SiNx) and silicon oxide (SiOx). The data line DL extends in the second direction and is arranged in parallel in the first direction.

The switching element TFT includes the gate electrode GE, a source electrode SE, a semiconductor pattern 154, and a drain electrode DE. The gate electrode GE is electrically connected to the gate line GL, and the source electrode SE is electrically connected to the data line DL. The semiconductor pattern 154 is formed on the gate insulating layer 140, corresponding to the gate electrode GE. An ohmic contact layer 165 is positioned on the semiconductor pattern 154. A data conductor including the drain electrode DE and the source electrode SE is positioned on the ohmic contact layer 165 and the gate insulating layer 140. The drain electrode DE is disposed to be spaced from the source electrode SE at a predetermined interval. The data conductor, the semiconductor disposed beneath the data conductor, and an ohmic contact member may be simultaneously formed using a single mask and have the substantially same planar shape.

The first common electrode 172 is formed to correspond to a pixel area that is defined by the gate line GL and the data line DL. The first common electrode 172 is formed on the gate insulating layer 140. The first common electrode 172 may be made of a transparent conductive material. For example, the first common electrode 172 is made of indium tin oxide (ITO) or indium zinc oxide (IZO).

The passivation insulating layer 150 is disposed on the first substrate 110 on which the switching element TFT and the first common electrode 172 are formed. The passivation insulating layer 150 may be made of an inorganic material such as silicon nitride (SiNx) and silicon oxide (SiOx), similar to the gate insulating layer 140. Further, the passivation insulating layer 150 may be made of an organic material. A contact hole CNT through which a portion of the drain electrode DE is exposed is formed on the passivation insulating layer 150.

The pixel electrode 191 is disposed on the first substrate 110 on which the passivation insulating layer 150 is formed and may be made of a transparent conductive material. For example, the pixel electrode 191 is made of indium tin oxide (ITO) or indium zinc oxide (IZO). The pixel electrode 191 contacts the drain electrode DE that is exposed through the contact hole CNT and is electrically connected to the switching element TFT. The pixel electrode 191 includes a plurality of slit patterns 192. The slit patterns 192 extend in a substantially parallel direction with an extending direction of the data line DL.

The first alignment layer 11 is formed on the first substrate 110 on which the pixel electrode 191 is formed. The first alignment layer 11 is a horizontal alignment layer that substantially horizontally aligns an optical axis of liquid crystal molecules 31 included in the liquid crystal layer 3 to a surface of the first substrate 110. The first alignment layer 11 horizontally aligns the liquid crystal molecules 31 in an electroless state.

The upper display panel 200 includes a second substrate 210, a light blocking pattern 220, a color filter 230, an overcoating layer 250, a second common electrode 272, and a second alignment layer 21. The second substrate 210 may be made of a transparent insulating material, similar to the first substrate 110.

The light blocking pattern 220 is disposed on the second substrate 210 to block light. The light blocking pattern 220 is referred to as a black matrix (BM). For example, the light blocking pattern 220 is disposed to correspond to a region in which the gate line GL, the data line DL, and the switching element TFT are formed.

The color filter 230 is disposed on the second substrate 210, corresponding to the pixel area. The color filter 230 may uniquely display one of the primary colors. An example of the primary colors includes the three primary colors, such as red, green, and blue, or yellow, cyan, magenta. Although not illustrated, the color filter 230 may further include a color filter that displays a mixed color of the primary colors or white, in addition to the primary colors.

The overcoating layer 250 is disposed on the second substrate 210 on which the light blocking pattern 220 and the color filter 230 are formed. The overcoating layer 250 serves to planarize the upper display panel 200. An example of the material forming the overcoating layer 250 includes an acryl resin.

The second common electrode 272 is formed on the second substrate 210 on which the overcoating layer 250 is formed. The first common electrode 172 and the second common electrode 272 may be made of a transparent conductive material or a conductive material such as opaque metal. For example, the first common electrode 172 and the second common electrode 272 is made of indium tin oxide (ITO), indium zinc oxide (IZO), graphene, carbon nanotube, or silver nanowires (AgNWs).

The second alignment layer 21 is formed on the second substrate 210 on which the second common electrode 272 is formed. The second alignment layer 21 is a horizontal alignment layer that substantially horizontally aligns an optical axis of liquid crystal molecules 31 included in the liquid crystal layer 3 to a surface of the second substrate 210. The second alignment layer 21 horizontally aligns the liquid crystal molecules 31 in the electroless state. The alignment directions of the first alignment layer 11 and the second alignment layer 21 are substantially parallel to each other. Further, the alignment directions of each alignment layer 11 and 21 may be constant.

The display 1 includes the liquid crystal layer 3 that is interposed between the lower display panel 100 and the upper display panel 200. The liquid crystal layer 3 includes the liquid crystal molecules 31 and reactive mesogen (RM) that helps a pretilt of the liquid crystal molecules 31. The liquid crystal molecules 31 included in the liquid crystal layer 3 are horizontally aligned by the first and second alignment layers 21 in the electroless state. The liquid crystal molecules 31 are vertically aligned by the voltage applied to the first and second common electrodes 172 and 272. That is, the vertical electric field is generated by the voltage applied to the first and second common electrodes 172 and 272, and the liquid crystal molecules 31 are vertically aligned by the vertical electric field.

The first common voltage is applied to the first common electrode 172, and the second common voltage having a level higher than that of the first common voltage is applied to the second common electrode 272. For example, a voltage of 0V is applied to the first common electrode 14 and a voltage that is equal to or higher than 10V is applied to the second common electrode 272.

According to the exemplary embodiment, the liquid crystal molecules 31 included in the liquid crystal layer 3 are temporarily vertically aligned by applying the common voltages to the first and second common electrodes 172 and 272 for a first period that is set every time each frame starts and then a gray scale is implemented by the voltages applied to the first common electrode 172, the second common electrode 272, and the pixel electrode 191.

Figure 4:
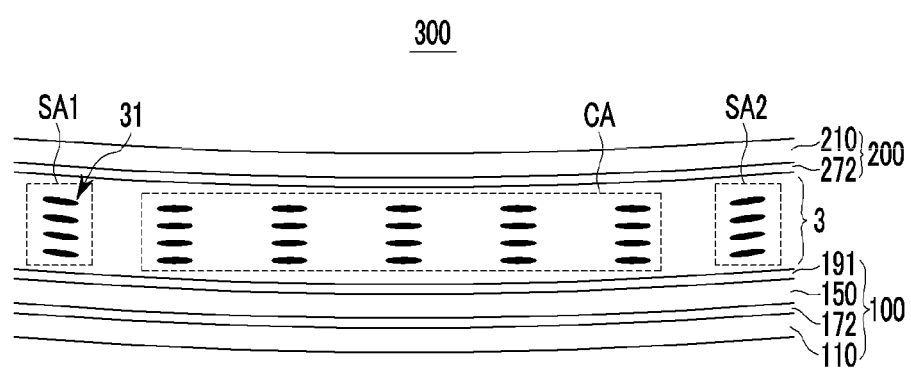
FIG. 4 is a schematic cross-sectional view of a curved display panel, according to the exemplary embodiment.

Next, the display panel 300 of the display 1 described above will be described with reference to FIG. 4. FIG. 4 is a schematic cross-sectional view of the curved display panel 300, according to the exemplary embodiment. As illustrated in FIG. 4, the liquid crystal display 1 includes the display panel 300 that is bent at a predetermined curvature.

The liquid crystal molecules 31 that are horizontally aligned to the display panels 100 and 200 are relatively more movable than the liquid crystal molecule that are vertically aligned to the display panels 100 and 200. When the display panel 300 including the horizontally aligned liquid crystal molecules is in a curved form, an external force may be applied to the liquid crystal layer 3, in side regions SA1 and SA2 of the display panel 300.

Due to the external force, the liquid crystal molecules 31 in the liquid crystal layer 3 may be movable distorting the alignment of the liquid crystal molecules. The distorted alignment of the liquid crystal molecules may not be appropriately controlled by the electric field generated in the liquid crystal layer, thus the light transmittance through the liquid crystal layer 3 is difficult to control. For example, a light leakage phenomenon may occur in the side regions SA1 and SA2 of the display panel.

Figure 5:
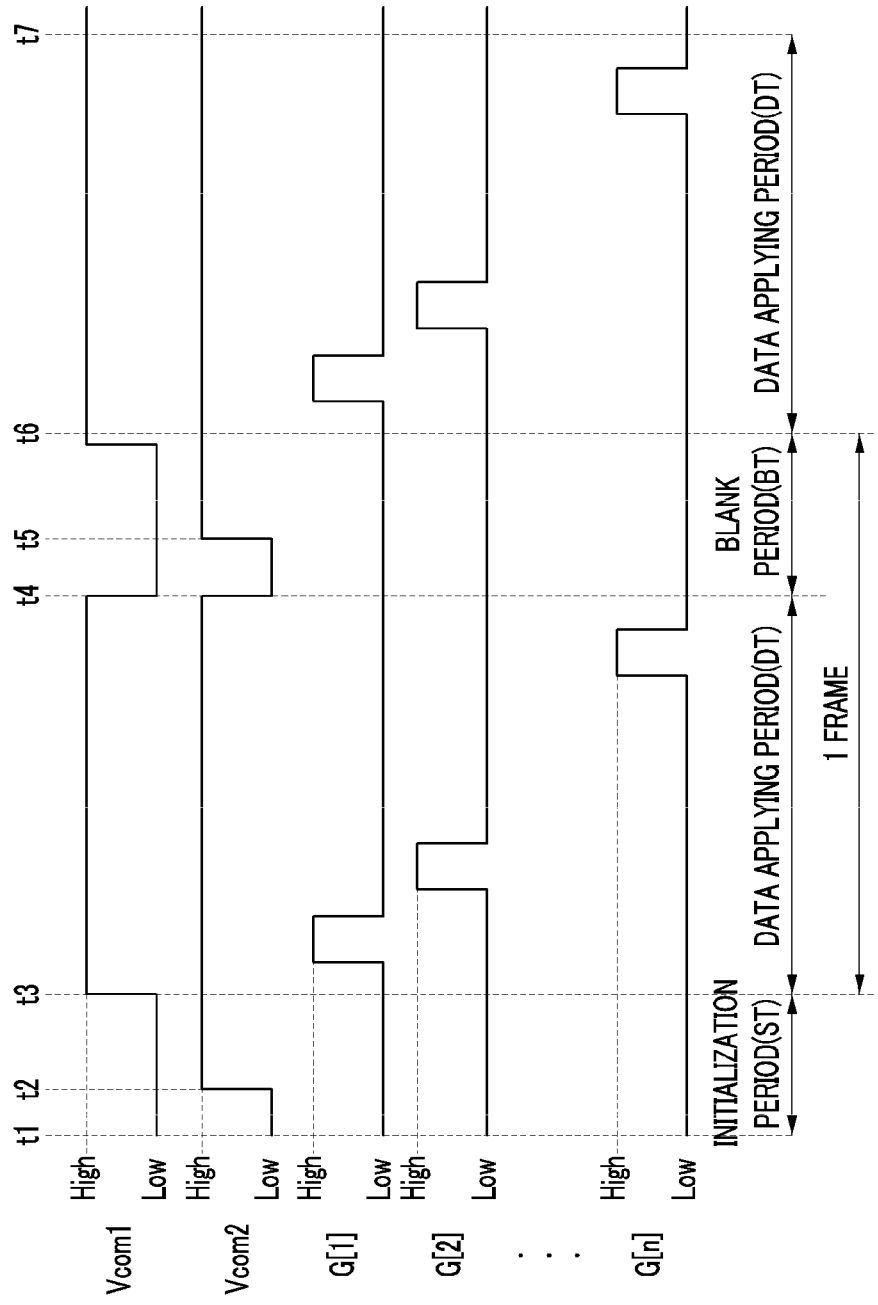
FIG. 5 is a timing diagram illustrating a driving method of a liquid crystal display, according to an exemplary embodiment.
Figure 6:
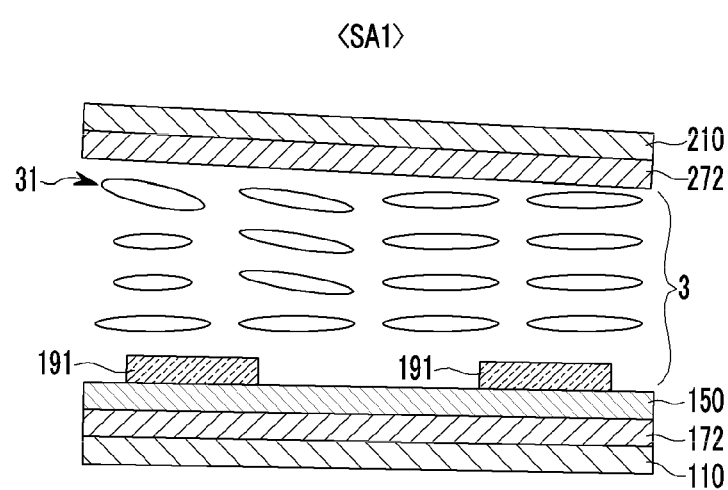
FIG. 6, FIG. 7, and FIG. 8 are exemplified diagrams illustrating liquid crystal molecules of which the alignment is changed in the display panel, according to the driving method of FIG. 5.
Figure 7:
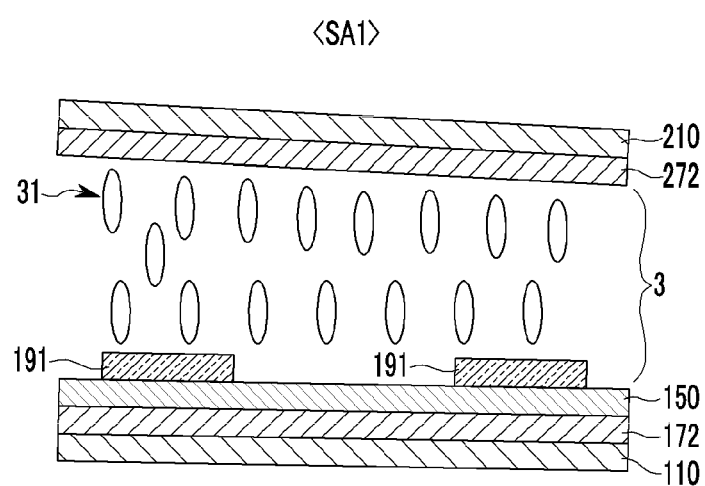
Figure 8:
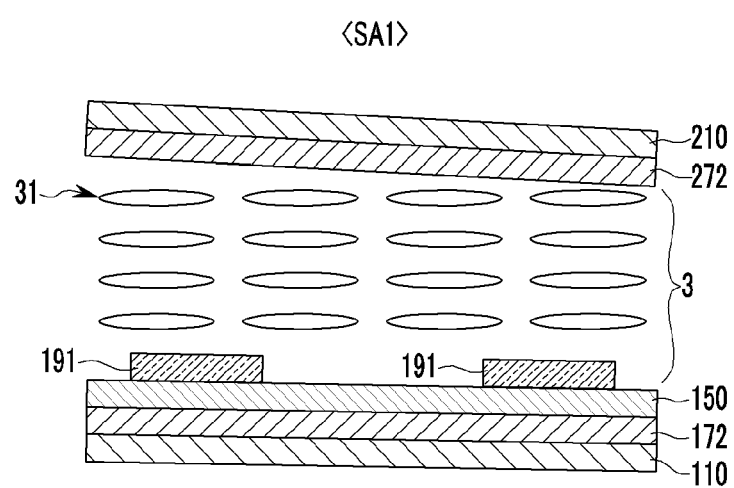

A driving method of the liquid crystal display 1, according to the exemplary embodiment, realigns the distorted alignment of the liquid crystal molecules 31 to prevent the light leakage phenomenon, which will be described in detail with reference to FIGS. 5 to 7. FIG. 5 is a timing diagram illustrating a driving method of a liquid crystal display 1, according to an exemplary embodiment. FIG. 6, FIG. 7, and FIG. 8 are exemplified diagrams illustrating the liquid crystal molecules of which the alignment is changed in the side region SA1 of display panel 300, according to the driving method of FIG. 5.

When the input control signal and the image signal IS are initially applied from the outside to the signal controller 600, the signal controller 600 outputs the third control signal CONT3 to the common voltage supplier 700. The common voltage supplier 700 applies the first common voltage Vcom1 to the first common electrode 172 and applies the second common voltage Vcom2 to the second common electrode 272, depending on the third control signal CONT3.

Referring to FIG. 5, both of the first common voltage Vcom1 and the second common voltage Vcom2 are applied to the corresponding common electrodes 172 and 272 at a low level Low at a first timing t1. The second common voltage Vcom2 is changed to a high level High at a second timing t2. Next, the electric field is generated in the liquid crystal layer 3 due to a difference between the voltage applied to the first common electrode 172 and the voltage applied to the second common electrode 272. The liquid crystal molecules 31 may be vertically aligned to the lower display panel 100 and the upper display panel 200 within the liquid crystal layer 3 by the electric field formed in the liquid crystal layer 3.

Next, the first common voltage Vcom1 is changed to a high level High at a third timing t3. Therefore, the voltages of the substantially same level High are applied to the first common electrode 172 and the second common electrode 272. The liquid crystal molecules 31 may be horizontally aligned to the lower display panel 100 and the upper display panel 200.

When an initialization period ST ends, the gate driver 400 applies gate signals G1 to Gn having an enable level High to the plurality of gate lines G1 to Gn depending on the second control signal CONT2. The gate signals G1 to Gn may be sequentially applied from a first gate line G1 to n-th gate line Gn. When the gate signals G1 to Gn having the enable level High are applied to the corresponding gate lines, each of the plurality of pixels PXs is applied with the corresponding data voltage. That is, the pixels connected to the gate lines G1 to Gn are sequentially charged with the corresponding data voltage from the data driver 500.

As such, when the data voltage is sequentially applied to the data lines D1 to Dm for one frame, and the gate-on voltage High is sequentially applied from the first gate line G1 to the final gate line Gn in the corresponding pixel, the common voltage supplier 700 supplies the first common voltage Vcom1 to the first common electrode 172 and the second common voltage Vcom2 having the low level Low to the second common electrode 272.

The first common voltage Vcom1 and the second common voltage Vcom2 are changed to the low level Low at a fourth timing t4 when a blank period BT starts in the one frame unit. According to some embodiments, the signal controller 600 may perform an impulsive driving within the blank period BT in which the gate signals G1 to Gn are not supplied. The common voltage supplier 700 applies the first common voltage Vcom1 and the second common voltage Vcom2 at different values within the blank period BT, depending on the third control signal CONT3 that is received from the signal controller 600. That is, to generate the electric field that may vertically align the liquid crystal molecules 31 in the liquid crystal layer 3 to the lower display panel 100 and the upper display panel 200, the first common voltage Vcom1 and the second common voltage Vcom2 with a sufficient voltage difference are respectively applied to the first common electrode 172 and the second common electrode 272.

The first common voltage Vcom1 is maintained at the low level Low and the second common voltage Vcom2 is changed from the low level Low to the high level High, at a fifth timing t5. The electric field is generated in the liquid crystal layer 3 due to the difference between the voltages applied to the first common electrode 172 and the second common electrode 272. The liquid crystal molecules 31 are vertically aligned to the lower display panel 100 and the upper display panel 200 within the liquid crystal layer 3 by the electric field formed in the liquid crystal layer 3, as illustrated in FIG. 7.

Next, the first common voltage Vcom1 is changed from the low level Low to the high level High at a sixth timing t6. Therefore, the substantially same voltage having the level High is applied to the first common electrode 172 and the second common electrode 272. The liquid crystal molecules 31 are horizontally aligned to the lower display panel 100 and the upper display panel 200.

A data applying period DT and the blank period BT are repeated in one frame unit, and the impulsive driving may be performed every frame or may be performed at a period of a predetermined frame. Further, the impulsive driving may also be performed within the initialization period ST in which the input control signal and the image signal IS are initially applied to the signal controller 600 from the outside.

Referring to FIG. 6, the alignment of the liquid crystal molecules 31 in the side region SA1 is distorted before the impulsive driving is performed. By the impulsive driving, when the first common voltage Vcom1 and the second common voltage Vcom2 having a predetermined voltage difference are applied to the first common electrode 172 and the second common electrode 272, the liquid crystal molecules 31 are vertically aligned to a direction of the surfaces of the lower display panel 100 and the upper display panel 200.

Further, after the impulsive driving ends, and the substantially same voltage is applied to the first common electrode 172 and the second common electrode 272, as illustrated in FIG. 8, the alignment of the liquid crystal molecules 31 are realigned depending on the directions of the alignment layers 11 and 21.

The driving method of the liquid crystal display 1, according to the exemplary embodiment, may reduce the light leakage phenomenon particularly in the side regions SA1 and SA2, due to the realigned liquid crystal molecules 31.

The foregoing disclosure may implement as codes that may be read by a computer in a medium that records programs. The medium that is readable by the computer includes various recording apparatuses in which data read by a computer system are stored. Examples of the medium include, but are not limited to, a hard disk drive (HDD), a solid state disk (SSD), a silicon disk drive (SDD), a ROM, a RAM, a CD-ROM, a magnetic tape, a floppy disk, an optical data storage apparatus, and a medium that may be implemented in a form of a carrier wave (e.g., transmission through the Internet). Further, the computer may also include the signal controller 600 of the display device. Therefore, the foregoing detailed description is not to be restrictively construed in all aspects but should be reckoned as being exemplary. The scope of the present disclosure is to be determined by a reasonable interpretation of the appending claims, and the changes within an equivalent range of the present disclosure are included in the scope of the present disclosure.

While the present disclosure has been described in connection with practical exemplary embodiments, it is to be understood that the present disclosure is not limited to the disclosed embodiments, but, on the contrary, is intended to cover various modifications and equivalent arrangements included within the spirit and scope of the present disclosure.

What is claimed is:
1. A liquid crystal display, comprising:
a display panel including a first display panel, a second display panel that includes a second substrate facing the first substrate, and a liquid crystal layer that is interposed between the first display panel and the second display panel and includes liquid crystal molecules, wherein the display panel has at least one portion formed in a curved surface, wherein the first display panel includes a first substrate on which a plurality of gate lines and data lines intersecting with each other are formed, a first electrode formed on the first substrate, and a pixel electrode disposed on the first electrode, wherein the second display panel further includes a second electrode formed on the second substrate, and wherein the first electrode of the first substrate and the second electrode of the second substrate are separated by the liquid crystal layer;
a common voltage supplier applying two voltages having a predetermined voltage difference to the first electrode and the second electrode within a period before a frame displaying an image on the display panel;
a gate driver applying a gate signal having an enable level to each of the gate lines after the period; and
a data driver applying a data voltage to the pixel electrode corresponding to the gate signal.
2. The liquid crystal display of claim 1, wherein:
the display panel further includes:
a first alignment layer disposed between the pixel electrode and the liquid crystal layer and horizontally aligning the liquid crystal molecules adjacent to the pixel electrode; and a second alignment layer disposed between the second electrode and the liquid crystal layer and horizontally aligning the liquid crystal molecules adjacent to the second electrode.

3. The liquid crystal display of claim 2, wherein:

alignment directions of the first alignment layer and the second alignment layer are parallel to each other.

4. The liquid crystal display of claim 1, wherein:

the liquid crystal layer further includes reactive mesogen that helps a pretilt of the liquid crystal molecules.

5. The liquid crystal display of claim 1, wherein:

the common voltage supplier applies a substantially same voltage to the first electrode and the second electrode before the data voltage is applied to the pixel electrode and after the period.

6. The liquid crystal display of claim 1, further comprising:

a signal controller controlling the common voltage supplier, the gate driver, and the data driver based on a control signal and an image signal input, wherein the signal controller controls the common voltage supplier to apply the two voltages having the predetermined voltage difference to the first electrode and the second electrode within the period when the control signal and the image signal are received.

7. A driving method of a liquid crystal display including a display panel including a first display panel, a second display panel that includes a second substrate facing the first substrate, and a liquid crystal layer that is interposed between the first display panel and the second display panel and includes liquid crystal molecules, the display panel having at least one portion formed in a curved surface, wherein the first display panel includes a first substrate on which a plurality of gate lines and data lines intersecting with each other are formed, a first electrode formed on the first substrate, and a pixel electrode disposed on the first electrode, wherein the second display panel further includes a second electrode formed on the second substrate, and wherein the first electrode of the first substrate and the second electrode of the second substrate are separated by the liquid crystal layer, the driving method comprising:

applying two voltages having a predetermined voltage difference to the first electrode and the second electrode within a period before a frame displaying an image on the display panel;

applying a substantially same voltage to the first electrode and the second electrode after the period; and applying a data voltage to the pixel electrode to display an image on the display panel after applying the substantially same voltage to the first electrode and the second electrode, wherein the first electrode of the first substrate and the second electrode of the second substrate are separated by the liquid crystal layer.

8. The driving method of claim 7, further comprising displaying the image on the display panel based on a control signal and an image signal;

applying two voltages having the predetermined voltage difference to the first electrode and the second electrode within the period when the control signal and the image signal are received.

9. The driving method of claim 7, wherein:

the display panel further includes:

a first alignment layer disposed between the pixel electrode and the liquid crystal layer and horizontally aligning the liquid crystal molecules adjacent to the pixel electrode; and a second alignment layer disposed between the second electrode and the liquid crystal layer and horizontally aligning the liquid crystal molecules adjacent to the second electrode.

10. The driving method of claim 9, wherein:

alignment directions of the first alignment layer and the second alignment layer are parallel to each other.

\* \* \* \* \*